United States Patent [19]

Bott

[11] 4,037,342

[45] July 26, 1977

[54] LICENSE PLATE HOLDER

[76] Inventor: John A. Bott, 931 Lakeshore Drive, Grosse Pointe Shores, Mich. 48236

[21] Appl. No.: 654,464

[22] Filed: Feb. 2, 1976

[51] Int. Cl.² .............................................. G09F 7/00
[52] U.S. Cl. ........................................ 40/209; 40/156
[58] Field of Search ............... 40/10 R, 200, 202, 209, 40/152, 154, 156, 129 C, 155

[56] References Cited

U.S. PATENT DOCUMENTS

| 2,194,106 | 3/1940 | Wiley | 40/209 |
| 2,489,477 | 11/1949 | Brecher | 40/156 |
| 2,827,722 | 3/1958 | Leclerc | 40/209 |
| 3,423,866 | 1/1969 | Bott | 40/209 |

FOREIGN PATENT DOCUMENTS

| 532,795 | 9/1955 | Italy | 40/209 |

Primary Examiner—John F. Pitrelli
Attorney, Agent, or Firm—Harness, Dickey & Pierce

[57] ABSTRACT

A license plate frame assembly is disclosed as consisting of a one-piece frame member fabricated of a molded plastic material, the frame member being of a generally rectangular configuration and having a frontal wall providing a decorative face. The frame member also including rearwardly projecting inner and outer enclosure walls defining a pair of spaced-apart recessed areas; the frame member is connected to the license plate by a pair of retaining clips associated one with each of the recessed areas and each including a resilient arm section adapted for engagement with the rearward side of the license plate and a retaining arm section adapted to be nestingly received within the associated recessed area, the retaining clips being formed with sharp outwardly projecting tabs adapted for engagement with the license plate to resist any relative movement between the plate and the frame assembly.

1 Claim, 6 Drawing Figures

U.S. Patent  July 26, 1977  4,037,342
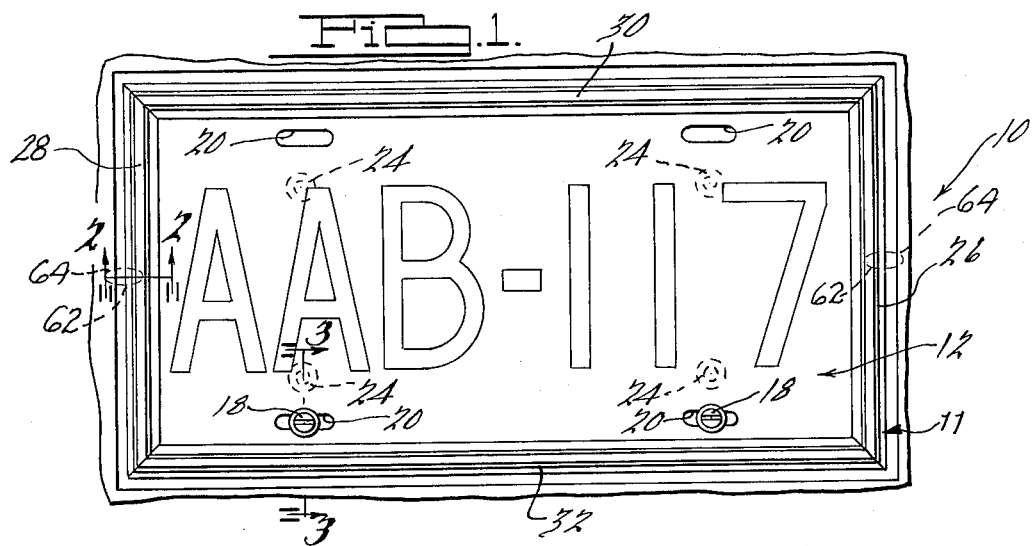
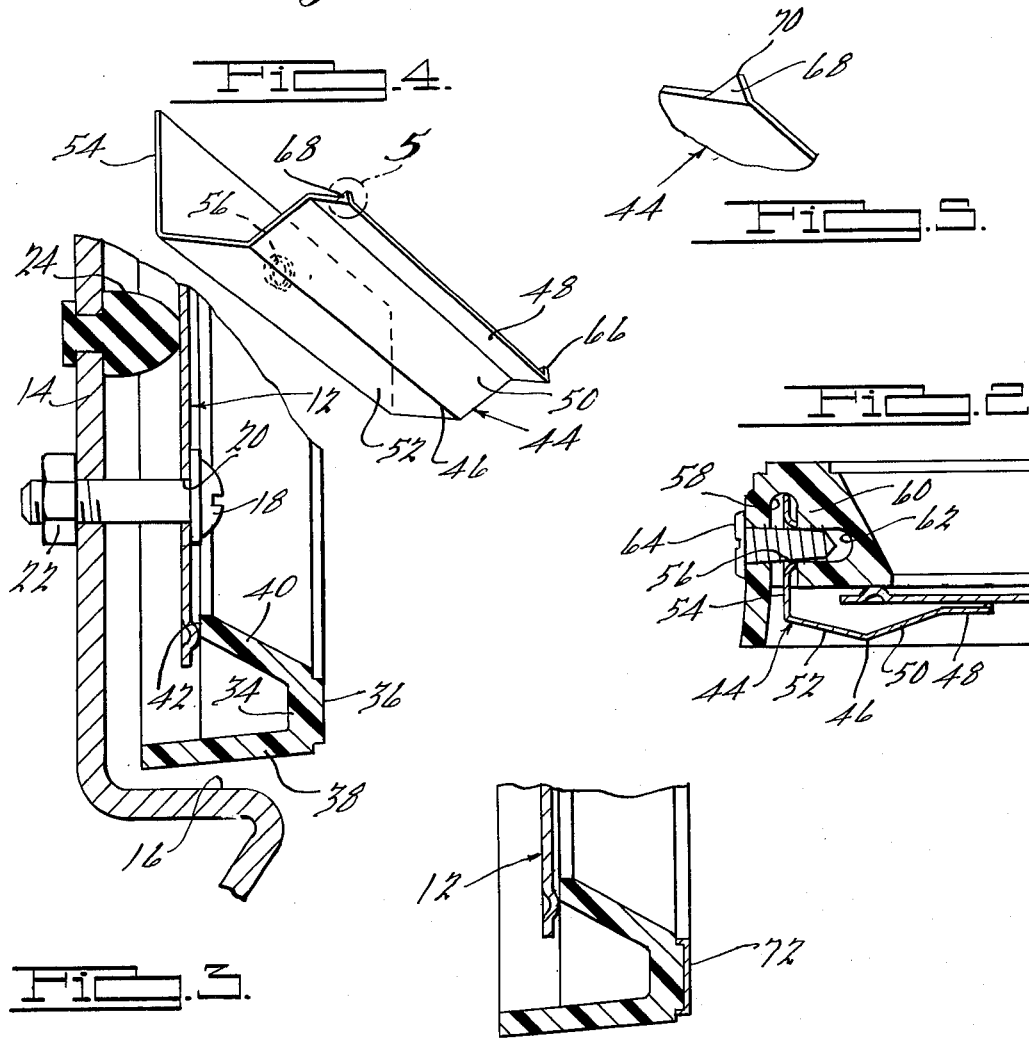
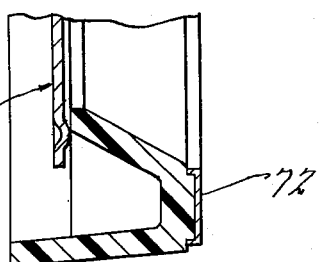

LICENSE PLATE HOLDER

BACKGROUND AND SUMMARY OF THE INVENTION

This invention relates generally to means for mounting license plates on automotive vehicles and the like, and more particularly, to a new and improved license plate frame assembly which is adapted to be secured directly to the license plate for enhancing the appearance thereof and providing protection for the license plate.

It is accordingly a general object of the present invention to provide a new and improved license plate assembly for automobile license plates and the like.

It is a more particular object of the present invention to provide a new and improved license plate frame assembly that is attractive in appearance and which may be positively secured to the license plate in a manner so as to assure against inadvertent disassembly of the frame from the license plate.

It is another object of the present invention to provide a new and improved license plate frame assembly of the above-described character which includes a novel retaining clip arrangement for securing the associated frame member to the license plate.

It is a further object of the present invention to provide a new and improved license plate frame assembly wherein the frame member may be provided with a decorative frontal face in order to enhance or complement the decor of the associated vehicle.

It is still a further object of the present invention to provide a new and improved license plate frame assembly, as above described, which may be fabricated of a molded polymeric material, such as molded plastic.

It is still another object of the present invention to provide a new and improved license plate frame assembly which is of a relatively simple design, is economical to manufacture and will have a long and effective operational life.

Other objects and advantages of the present invention will become apparent from the following detailed description taken in conjunction with the accompanying drawing.

BRIEF DESCRIPTION OF THE DRAWING

FIG. 1 is an enlarged front elevational view of the license plate frame assembly of the present invention, as shown in operative association with a typical vehicle license plate and a fragmentary portion of an associated vehicle body;

FIG. 2 is an enlarged fragmentary cross-sectional view taken substantially along the line 2—2 of FIG. 1;

FIG. 3 is an enlarged fragmentary cross-sectional view taken substantially along the line 3—3 of FIG. 1;

FIG. 4 is an elevated perspective view of one of the retaining clips incorporated in the license plate frame assembly of the present invention;

FIG. 5 is an enlarged fragmentary perspective view of the portion of the structure shown within the circle 5 of FIG. 4; and FIG. 6 is an enlarged fragmentary cross-sectional view, similar to FIG. 3, and illustrates a slightly modified embodiment of the present invention.

DESCRIPTION OF A PREFERRED EMBODIMENT

Referring now in detail to the drawing and in particular to FIGS. 1 and 3 thereof, a license plate frame assembly 10, in accordance with one preferred embodiment of the present invention, is shown in operative association with a conventional vehicle license plate 12 that is shown mounted on a vehicle body panel or support member 14 having a generally rectangular-shaped depressed or recessed area 16 within which the plate 12 and frame assembly 10 are located. The license plate 12 is retained within the area 16 by means of a plurality of suitable screws, bolts or the like 18 which extend through slots 20 formed in the license plate 12 and are provided with retaining nut or the like 22. A plurality of elastomeric bumpers 24 are provided between the plate 12 and depressed area 16 and bear against the rearward side of the plate 12 in a manner well known in the art.

The assembly 10 comprises a frame 11 that extends around the outer margin of the license plate 12 and encloses its outer periphery. Toward this end, the frame 11 comprises laterally spaced side sections 26 and 28, a top section 30 and a lower or bottom section 32, all of which sections 26–32 are of uniform cross section, with the exception of the means for retaining the license plate 12 within the frame assembly 10 hereinafter to be described. As best seen in FIGS. 2 and 3, the sections 26–32 of the frame assembly 10 comprise a frontal wall 34 which defines a forwardly projecting relatively flat decorative face 36. The frontal wall 34 is integrally connected to a rearwardly projecting outer enclosure wall or flange 38 and to a rearwardly projecting inner wall or flange 40 which defines a plate abutment surface 42. The sections 26–32 are preferably fabricated of a suitable molded polymeric material and as such, the various sections 26–32 and walls 34–40 are formed of a one-piece unitized construction. One preferred material from which the sections 26–32 may be fabricated is A.B.S. plastic.

The frame 11 is secured to the plate 12 by means of a pair of identical retaining members or clips, generally designated by the numeral 44, which may be located at either the opposite ends of the license plate 12 or at the upper and lower sides thereof. In the construction of the frame assembly 10 of the present invention, the clips 44 are preferably located at the laterally opposite ends of the plate 12 and as such are operatively associated with the side sections 26, 28. Each of the retaining clips 44 comprises a resilient arm section 46, as best seen in FIG. 2, which extends laterally inwardly behind the rearward side of the plate 12 and includes a plate engaging end portion 48. Each of the arm sections 46 also comprises a pair of inclined spring portions 50, 52 which impart a resiliency to the arm section 46 for purposes to be hereinafter described. The retaining clips 46 also comprise retaining leg sections 54 which are arranged at generally right angles to the sections 46 thereof when the clips 44 are operatively installed upon the frame assembly 10, also as best seen in FIG. 2. The retaining leg sections 54 of the clips 44 are formed with suitable apertures 56 and are adapted to be nestingly received within elongated recesses 58 defined in the side sections 26, 28 of the frame by enlarged thickness portion 60 thereof. The side sections 26, 28 are formed with laterally inwardly extending blind bores 62 with which the apertures 46 of the clips 44 may be aligned, whereby suitable sheet metal screws or the like 64 may be secured for fixedly attaching the retaining clips 44 upon the frame 11.

As will be appreciated by those skilled in the art, the frame assembly 10 may be either assembled onto the license plate 12 prior to the plate 12 being mounted on the associated vehicle body member 14 or, alternatively, the plate 12 may be mounted on the support member 14 and thereafter, the frame assembly 10 may be assembled onto the plate 12. Regardless of which procedure is followed, the frame 11 is surmounted upon the license plate 12, and thereafter, the clips 44 are placed in the positions shown in FIG. 2, whereupon the apertures 56 are aligned with the blind bores 62. Thereafter, the screws 64 may be threaded into the bores 62 for fixedly securing the retaining clips 44 and hence the plate 12 to the frame assembly 10. With this arrangement, it will be seen that the arm sections 46 exert a resilient force against the rearward side of the plate 12 and thereby forcefully urge the plate 12 toward engagement with the frame 11. In accordance with one of the features of the present invention, it will be seen that the retaining clips 44 are entirely hidden from view and that the only fastener or retaining members which are exposed to view are the heads of the screws 18 and 64. It will also be noted that the frame assembly 10 is supported entirely on the license plate 12 and no direct fastenings or connections are made between the frame assembly 10 and the vehicle body. In accordance with another feature of the present invention, the corners of the resilient arm sections 46 are formed with pairs of forwardly projecting tabs 66, 68 which define relatively sharp points 70. The points 70 of the retaining clips 44 are designed so as to be sufficiently sharp so as to positively engage the rearward side of the license plate 12 upon assembly of the retaining clips 44, whereby to resist movement of the license plate 12 relative to the frame assembly 10.

It is to be noted that for certain applications, the inner wall or flange 40 may be eliminated, whereby the outer marginal edge of the license plate 12 will bear directly against the rearward side of the frontal wall 34, with the clips 44 being appropriately shaped to securely hold the plate 12 against the wall 34. It will also be noted that the frame 11, and in particular the decorative face 36 thereof, may be provided with any suitable decoration either identical to or complementary to the remaining exposed portions of the frame 11. For example, it is contemplated that the decorative face 36 could be provided with a suitable leather or woodgrain appearance, could be stippled or have some other suitable textured appearance, depending upon the application thereof. Alternatively, it is contemplated that the decorative face 36 could have a suitable decorative covering material 72 as indicated in FIG. 6. The material 72 could be applied in any suitable manner, such as by suitable hot stamping operation, whereupon various desired aesthetic appearances can be achieved.

While it will be apparent that the preferred embodiments of the invention disclosed are well calculated to fulfill the objects above stated, it will be appreciated that the invention is susceptible to modification, variation and change without departing from the proper scope or fair meaning of the subjoined claims.

I claim:

1. A license plate frame assembly comprising, a one-piece frame member fabricated of a molded polymeric material, said frame member being of a generally rectangular configuration and having a frontal wall arranged parallel to the license plate to be assembled thereto, said frame member also including inner and outer rearwardly projecting enclosure walls integrally connected to said frontal wall and defining therewith spaced apart rearwardly facing retaining clip receiving areas, said areas comprising a pair of spaced parallel slots arranged at generally 90° to the plane of the license plate and located on opposite parallel edges of said frame member, a pair of retaining clips associated one with each of said areas and each including a resilient arm section adapted for engagement with a rearward side of the license plate and a retaining leg section arranged at generally right angles to the associated resilient arm section and adapted to be nestingly received in one of the receiving areas, said retaining leg sections each having an aperture therein, means formed integrally of said retaining clips comprising folded corners of said resilient arm sections of said retaining clips which provide sharp projections extending from the plane of the associated clips and adpated to engage the license plate for resisting relative movement between the license plate and said frame assembly, an inwardly extending blind bore formed in said frame member at each of said receiving areas and adpated to have the aperture of the associated retaining clip aligned therewith upon insertion of the retaining leg into said receiving area, and a pair of threaded fastening elements cooperable with said bores and apertures for removably securing said retaining leg sections of said clips in said receiving areas.

* * * * *